April 26, 1966  L. B. ROSEN  3,247,956
PRESSURE SENSITIVE TAPE
Filed Feb. 25, 1964

*Leonard B. Rosen*
INVENTOR

BY *Jacobi & Davidson*
ATTORNEYS

United States Patent Office 3,247,956
Patented Apr. 26, 1966

3,247,956
PRESSURE SENSITIVE TAPE
Leonard B. Rosen, R.D. 2, Jamestown, Pa.
Filed Feb. 25, 1964, Ser. No. 347,278
1 Claim. (Cl. 206—59)

This invention relates in general to pressure sensitive tape, and in particular, to an improved form of such tape which permits an end portion thereof to be easily gripped or grasped notwithstanding its engagement with an underlying piece or length of the tape.

A serious inconvenience in the use of pressure sensitive tape as previously supplied resides in the tendency of a cut or torn end of the tape to tightly adhere to an underlying length or piece of the tape, such as for example, the next layer in a body or roll of tape as normally supplied. Various dispensing devices have been devised wherein a projecting portion or holding surface of the dispenser carrying a cutter edge is provided so that the cut end of the tape adheres thereto after being severed by the cutter edge. In this manner, the cut end of the tape is physically prevented from contacting and adhering to the underlying layer of the roll. Still, if the tape breaks during use, as usual, the operator faces the unpleasant task of attempting to free the "stuck" end so as to be able to grasp the same and obtain a new length of tape from the roll. Furthermore, a portion of the length of tape is exposed to the atmosphere in such dispensing devices, and this portion becomes unusable after some given period of time.

Consistent with the use of a dispensing device, and/or as an alternative thereto, there have been prior suggestions to prevent the free end of the tape from inconveniently adhering to the body of the roll. To this end, a small piece of paper or other flexible material is secured to the free end of the tape. Such piece prevents the adhesive surface of the tape from contacting the body of the roll. In this manner, a small non-adhesive tab is provided whereby the tape can be grasped to start unwinding from a fresh roll. The free end of the tape can, alternatively, be turned back upon itself so that the adhesive surfaces of the respective underlying and overlying portions of the tape are sandwiched between two layers of the tape backing strip, thereby likewise providing a small tab.

With the use of tabs, there remains the disadvantage of having a small portion of the tape nonadhering. In many applications, the nonadhering tab must be cut from the length of tape before the tape can be used. Still further, the tabs are only effective at the start of use of a roll.

Thus, the prior means for preventing adherence of the free end of a roll of pressure sensitive tape have the common disadvantage of requiring some positive action by the user of the tape, and they are ineffective if the tape accidently breaks, or in the case of use of dispensing devices, if the cut end should become dislodged from the holding surface provided therefor. Additionally, since the tape is normally very thin, and often transparent or translucent, difficulty can be encountered even in finding the end point of the outer layer of the roll.

Bearing in mind the above, the present invention has as its primary object the elimination of the aforesaid problems without in any way detracting from the usefulness of pressure sensitive tape. More specifically, it is an object of the present invention to provide a simple means which is easily associated with pressure sensitive tape whereby the free end of a given length of tape adheres to the body or roll and/or an underlying length of the tape so as to form a recess or pocket in the end portion, which recess or pocket permits the easy grasping of the end.

Consistent with the preceding objects, it is a still further object of the present invention to provide such a means in association with pressure sensitive tape, which means takes the form of an elastic thread. In this connection, a more detailed object hereof is to provide such a thread in association with a length of pressure sensitive tape whereby the thread is automatically operative to cause a puckering or buckling of the tape adjacent the point where the thread is disposed at a free end of the tape.

Yet further, additional, and somewhat more specific objects of the present invention include the following: (a) the provision of such an improved pressure sensitive tape which is constructed with a small diameter elastic thread and cellophane tape having a pressure sensitive adhesive on one major face thereof; (b) the provision of such an improved pressure sensitive tape which can be supplied in roll form with the thread secured to the adhesive face thereof, and yet with the roll having a substantially flat contour across its periphery; (c) the provision of such an improved pressure sensitive tape wherein the pressure sensitive adhesive on the tape itself serves to secure the elastic thread in desired position so that the same is operative to cause the aforesaid puckering or buckling at a free end of the tape so as to thereby permit an operator to easily grasp the free end; (d) the provision of such an improved pressure sensitive tape wherein the elastic thread can be of either the same color as the tape, or of a contrasting color from the tape whereby a free end of the tape is more easily identifiable; and (e) the provision of a method of making such an improved pressure sensitive tape so that the same can be made available at minimum cost for widespread use.

The invention resides in the combination, arrangement and method of making an improved pressure sensitive tape which conforms with the preceding objects. The invention will be better understood, and objects other than those set forth above will become apparent, after reading the following detailed description. Such description makes reference to the annexed drawings presenting preferred and illustrative embodiments of the invention.

Figure 1:
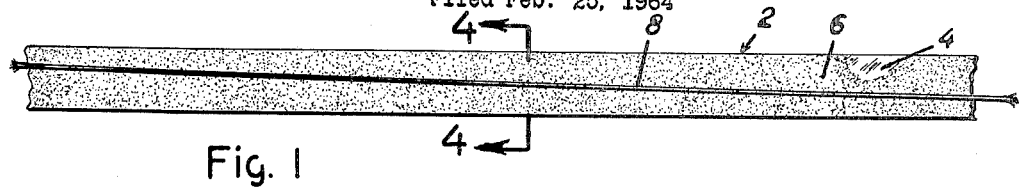
FIGURE 1 is a bottom plan view of a length of pressure sensitive tape constructed in accordance with the present invention.

If reference is first made to FIGURE 1, it will be noted that the length of tape shown therein is generally designated by the numeral 2. Such tape includes a backing strip or film 4 carrying a pressure sensitive adhesive 6 on one major face thereof. The backing strip or film 4 can be made of various materials including, by way of example, cellophane, polyethylene, and polypropylene. The specific material from which the backing strip 4 is made is generally unimportant insofar as the invention is concerned. The important characteristic is that the backing strip possess sufficient strength to permit the tape to serve its intended use.

Similarly, the pressure sensitive adhesive 6 can take various forms. Preferably, such adhesive is of the well known type now commonly applied to cellophane pressure sensitive tape. However, the adhesive requirements for a particular use can dictate the particular adhesive incorporated and/or carried by the backing strip. The important and controlling factor is that there be a pressure sensitive tape which is subject to problems such as outlined above so that the invention can easily serve its intended function.

Consistent herewith, the length of pressure sensitive tape 2 shown in FIGURE 1 has an elastic thread 8 secured thereto. The elastic thread 8 will have a diameter and size sufficient to permit the thread to achieve the desired result, as explained more fully below. However, in any event, the diameter of the thread will be a small fractional part of the width of the tape so that the adhesive or securing properties of the tape, as normally existent, will not meet with any significant interference from the thread itself.

In accordance herewith, a length of tape such as shown in FIGURE 1 with the thread 8 secured thereto would be used in the normal manner. A portion of the tape would be cut as desired for a particular use, and the tape would then be applied to a surface to be covered thereby, to surfaces to be secured together thereby, and/or to a particular component. The pressure sensitive adhesive 6 carried on the backing strip or film 4 would operate in exactly the same manner that it normally operates in connection with pressure sensitive tape which does not have the thread 8 thereon. The thread 8 would not substantially interfere in any way with use of the tape, as indicated above.

Figure 4:
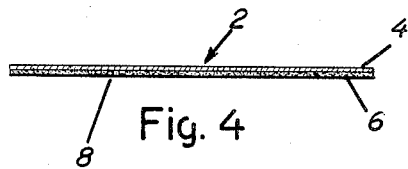
FIGURE 4 is a transverse sectional view taken on the line 4—4 of FIGURE 1 and showing a section of pressure sensitive tape constructed in accordance herewith.

At the same time, the thread 8 is the very means which automatically causes a free end portion of the tape to pucker or buckle there adjacent. As shown in FIGURE 4, the thread 8 is imbedded or secured to and generally at least partially within, the adhesive or adhesive layer 6. The adhesive layer is secured to the backing strip or film 4 by virtue of its own adhesive properties, and at the same time, the adhesive layer serves to secure the thread 8 in its desired position. In the situation shown in FIGURE 4, the thread is relaxed, i.e., substantially unstretched, or at least not stretched to its maximum extent. This is the condition of the thread as it exists in a roll of tape constructed in accordance herewith.

Figure 5:
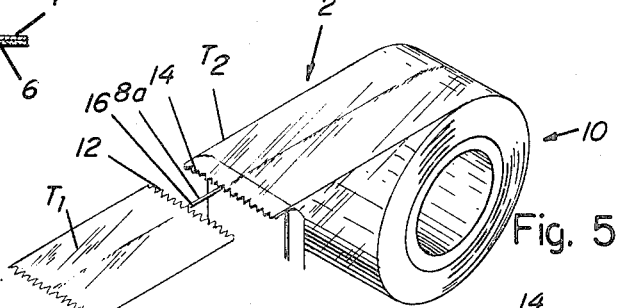
FIGURE 5 is a perspective view showing the manner in which a given section of tape may be severed from a length thereof, and showing on an exaggerated basis the action of the elastic thread associated with the tape.
Figure 6:
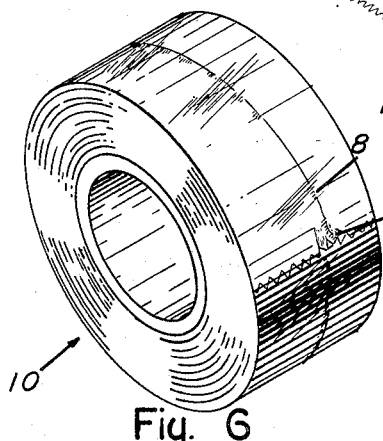
FIGURE 6 is a perspective view of a roll of pressure sensitive tape constructed in accordance with the present invention.

When a portion or length of the tape is to be severed from the roll, then the action of the thread 8 becomes particularly significant. In FIGURE 5, a roll 10 of the tape 2 is shown as having a forward portion $T_2$ extending therefrom. Adjacent the forward portion $T_2$ is another length of the tape which has been cut from the remainder of the roll, such other length of the tape being designated as $T_1$. Extending between the adjacent free ends of the respective portions or sections $T_1$ and $T_2$ is a short length of the elastic thread, such short length being designated as 8a. The existence of this short length 8a of the thread 8 results from a usual cutting operation. Specifically, when the rear edge 12 of the portion $T_1$ was severed from the forward edge 14 of the portion $T_2$, the thread 8 was stretched during the severing operation. This results from the fact that the tape is more easily cut than the thread during a normal cutting operation. Moreover, the preferred embodiment hereof contemplates using an elastic thread which is less easily cut, even under a normal cutting operation, than the tape itself.

In any event, the length 8a of the thread, having been stretched during the cutting operation, and then breaking as a result of the cutting operation, as at the forward edge 16 thereof, tends to return to its unstretched condition. The return to the unstretched condition exerts somewhat of a lifting force at the forward edge 14 of the portion $T_2$ so as to cause such edge to buckle or pucker about the then contracting thread portion 8a.

Figures 7, 8:
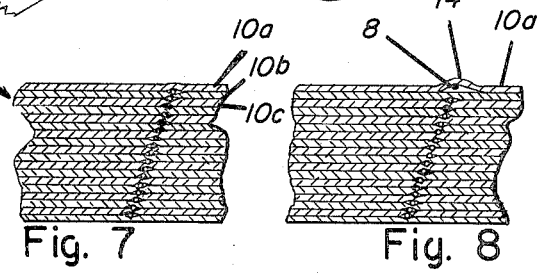
FIGURE 7 is a transverse sectional view taken through a roll of tape constructed in accordance herewith at some location removed from the outer free end of the tape on the roll.
FIGURE 8 is a transverse sectional view taken through a roll of tape constructed in accordance herewith at a location adjacent the outer free end of the tape on the roll.

The puckering or buckling referred to above can possibly be more easily understood by reference to FIGURES 7 and 8. In FIGURE 7, one portion of a roll 10 of the tape is shown. This roll includes a plurality of layers 10a, 10b, 10c, etc. Each such layer conforms to the length of tape 2 shown in FIGURE 1. However, in FIGURE 7, the successive layers with the thread carried thereon are shown at some point remote from the outer free edge of the roll. In contrast, in FIGURE 8, the outer layer 10a is shown adjacent the free end thereof or at the outer end of the roll. This layer corresponds to the portion $T_2$ referred to above and has a forward free edge 14. It will be noted that in the vicinity of such free edge adjacent the thread 8, there is a puckering. This puckering is sufficient to permit an operator to insert his fingernail or the like under the thread 8 and the outer free end of the tape so as to remove the free end from its engagement with the underlying layer or length of tape. It is to be remembered that the puckering or recess formed about the thread 8 at the outer free end of the tape results from the contraction of the thread during a cutting operation. Admittedly, the cutting has been shown in FIGURE 5 as being achieved over a serrated edge where there is a pulling on the tape. This particular type of cutting was selected for illustrative purposes because it facilitates an understanding of the manner in which there is a pull and then relaxing of the tape. However, it has been found that virtually any tape-cutting operation of the type commonly used in the home, office, or the like, results in some pulling on the severed portion of the tape so that the result is substantially the same as that described. The elastic tends to stretch in each instance from the roll rather than from the severed portion of the tape, and thus as the elastic thread returns to its relaxed condition, it causes the aforesaid puckering.

From the preceding discussion, it will be understood that the elastic thread has sufficient elasticity to cause the puckering adjacent the thread at the free edge of the tape. The thread is preferably made of rubber such as used in ordinary rubber bands. However, any elastic material can be used in the thread to achieve the desired operation with the elasticity being adjusted in accordance with the intended result. In any instance, as emphasized in the preceding discussion of this specification, the thread does not interfere with the adhering properties of the tape during its normal use, but instead, operates at the time of severence to pucker the free end.

Although the elastic thread may be colored identically with the pressure sensitive tape, a preferred embodiment of the invention contemplates using an elastic thread which has a contrasting color to that of the pressure sensitive tape, specifically, a preferred embodiment hereof would utilize a clear cellophane backing strip or film 4, a relatively clear pressure sensitive adhesive layer 6, and for example, a red, blue, or green thread. The color of the thread would tend to help an operator to immediately identify the free end of the tape. Interference in identification from tape carried on underlying portions of a roll would not be particularly severe because, as explained more fully below, the thread portions are offset with respect to one another in successive layers on a roll of tape.

Figure 2:
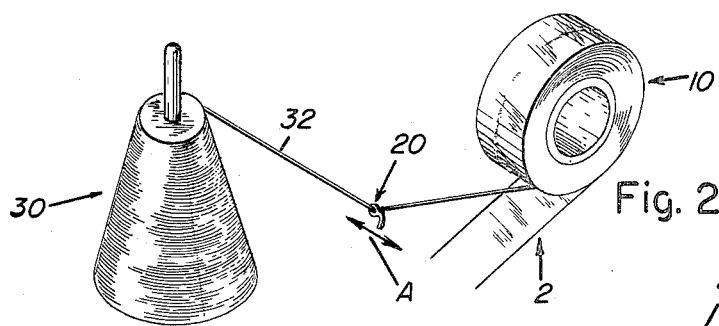
FIGURE 2 is a schematic and illustrative view of certain associated components and means as utilized in accordance herewith to form a roll of pressure sensitive tape.

More specifically, in order to provide an ultimate roll of tape which has a generally flat outer peripheral contour, it is desirable to distribute the thread laterally across the tape as the roll is wound. Thus, as shown in FIGURE 2, a guide means such as an eye 20 can be used in association with a roll 10 of the tape and a supply 30 of elastic thread. The thread 32 from the supply 30 is fed through the eye 20 and then wound into the roll 10 as tape layers are provided thereon. Of course, suitable equipment would be utilized to make the roll 10 more or less a takeup roll, to operate the eye 20 so that it moved reciprocally as indicated by the arrows A, and to supply the tape 2 from a suitable source. Still, the movement of the eye 20 is such as to cause the thread to be distributed laterally across the roll 10 as it is wound so that the ultimate roll has a generally flat outer contour and so that the thread does not cause an undesired bulging throughout the roll of tape, as may otherwise be the case without proper distribution.

Figure 3:
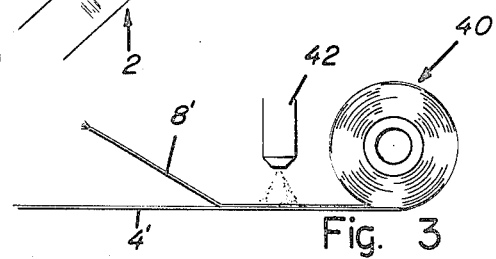
FIGURE 3 is a schematic and illustrative view of components and means used in accordance with a modified embodiment hereof to form a roll of pressure sensitive tape in accordance herewith.

As an alternative to the method of FIGURE 2 which contemplates applying the thread to essentially a takeup roll 10, the arrangement of FIGURE 3 can be utilized. Here, the pressure sensitive adhesive and thread are substantially simultaneously applied to the backup strip. Specifically, in FIGURE 3, a takeup roll is designated by the numeral 40, a backup strip designated by the numeral 4' is shown as being fed to such roll, a thread designated by the numeral 8' is shown as being moved into engagement with the backup strip 4', and a spray head 42 is shown as being disposed to spray a layer of pressure sensitive onto the backup strip 4' after the same has received the thread 8' thereon. With this arrangement, the thread 8' would be imbedded in the pressure sensitive adhesive layer rather than being secured to the outer surface thereto, or rather than being only partially imbedded therein.

The particular manner by which the improved thread of the invention is made can vary depending upon production requirements and plant facilities. In any instance, however, a thread would be fed from a supply and distributed across the pressure sensitive tape as ultimately wound into a roll so that the roll would not have undesirable bulges or ridges therein in its final form. It will be readily appreciated that the eye 20 used in the arrangement of FIGURE 2 can be utilized in the arrangement of FIGURE 3. It will further be readily apparent that other methods can be employed to obtain the improved tape in accordance herewith.

From the preceding discussion, it will be understood that the elastic thread is continuous along any given length of pressure sensitive tape made in accordance with the invention. Additionally, it should be noted that while the thread has been described as remaining with the unsevered length of a roll following a severing or breaking of the tape, the desired result would be achieved even if a short portion of the thread pulled free from the remaining length of a roll. In this instance, there would be a puckered void or recess in that edge portion of the unsevered remaining length of the tape, which void or recess would facilitate removal of the end in question from the roll or underlying layer.

Having now described the invention in considerable detail, it will be appreciated that the objects set forth at the outset of the present specification have been successfully achieved. Accordingly, what is claimed is:

In a severable pressure sensitive tape means wherein, when a portion of said tape means is severed from the remainder thereof, the free end of the remainder is puckered to facilitate grasping thereof for a subsequent severing operation, the improvement comprising:

an elongated length of flexible film having a pressure sensitive adhesive coated upon one surface thereof;

an elastic thread extensible from an unstretched condition to a stretched condition;

said elastic thread extending along the adhesive coated surface of said flexible film and being adhered thereto in an unstretched condition;

said film being fabricated of a material which severs more readily than the material of said thread;

said flexible film and adhered thread being wound into a successive series of convolutely disposed layers thereby defining a roll of tape;

said roll of tape having a free end which is adapted to be severed from the remainder thereof;

said flexible film being severed before said elastic thread when said free end is severed from said roll, thereby causing said elastic thread between said severed film portion and said remaining film portion to extend to a stretched condition whereupon, when said stretched thread is severed, it springs back to its unstretched position thereby causing a pucker at the end of the film remaining on said roll.

References Cited by the Examiner

UNITED STATES PATENTS

| | | | |
|---|---|---|---|
| 2,387,593 | 10/1945 | Lesser | 117—68.5 |
| 2,857,047 | 10/1958 | Edelson | 206—58 |
| 2,876,893 | 3/1959 | Blackford et al. | 206—59 |

THERON E. CONDON, *Primary Examiner.*

W. T. DIXSON, *Assistant Examiner.*